June 16, 1931.   E. SCHULTHESS   1,810,032
OIL HOSE
Filed April 16, 1931
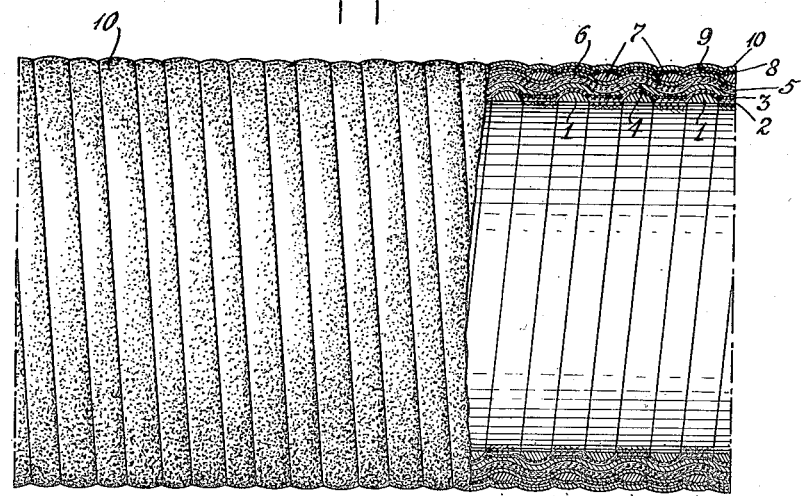
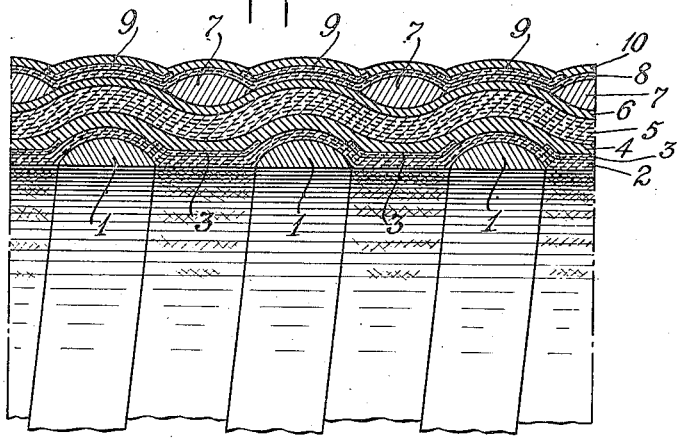
WITNESS
G. V. Rasmussen
INVENTOR
ERNEST SCHULTHESS
BY
ATTORNEYS Patented June 16, 1931

1,810,032

UNITED STATES PATENT OFFICE

ERNEST SCHULTHESS, OF SOUTH ORANGE, NEW JERSEY

OIL HOSE

Application filed April 16, 1931. Serial No. 530,593.

My invention relates to a construction of oil hose and particularly to a combination oil suction and discharge hose for use, for example, with field tanks or reservoirs.

An object of my invention is to provide a construction of oil hose of greater flexibility, more durable, and presenting a smoother interior surface than those now on the market. A more particular object of the invention is to provide a construction of oil hose which will withstand distortions without excessive stress being applied to the structure so as to permanently injure the material. A still further object of the invention is to provide a construction which will withstand a large internal pressure.

A particular embodiment of my improved oil hose is illustrated in the accompanying drawings, in which Fig. 1 shows a portion of hose partly in section, and Fig. 2 shows a segment of such hose in section. Fig. 3 shows a section of a modification.

Referring more particularly to the drawings, 1 designates a helix of a wire forming the internal bracing member of the hose. As clearly shown in the drawings, the cross-section of this wire is preferably in the form of approximately a segment of a circle whose chord is shorter than its diameter. For convenience of description the wire will be referred to as "segment-sectioned". Suitable dimensions for such a wire are ¾" width and $\tfrac{7}{32}$" thickness. Such segment-sectioned wire has great strength, eliminates chafing of the fabric which overlies it, produces a very smooth interior surface and allows the succeeding structure of the hose to flex in a natural way free from any undue strain. The form of the helix in which this wire 1 is wound is such that the spaces between the helix elements are preferably of substantially the same width as the width of the wire, say ¾ of an inch.

Over this helix of wire is applied one or more plies of strong bias-cut fabric or closely woven duck 2, preferably frictioned with an oil-resisting compound for preventing gasolene, oil, or other liquids, from percolating through such duck into the body of the hose ply or plies. These fabric plies 2 are applied upon the helix of wire 1 in such a manner that the fabric follows the contour of the wire snugly and permits the fabric to flex naturally without undue strain, the corrugated formation of the fabric eliminating practically all the strain brought to bear by the segment section wire 1. A strip of fabric 3 is now helically applied upon the fabric 2 bridging the spaces between the wire 1. Preferably the fabric 3 is a strip of fabric one inch in width. Besides adding strength to the hose, this fabric 3 holds the plies of fabric 2 in place in the helix between the segment section wire 1 and is an additional safeguard to prevent oils or other liquids from penetrating into the oil- and gasolene-resisting rubber tube 4. It also has independent freedom of movement when the hose is flexed, diminishing the creation or existence of strains in the hose structure.

Over the fabrics 2 and 3 is placed a rubber cushion 4 in any thickness determined by the requirement as to service, particularly with respect to the pressures and stresses which the particular hose is designed to withstand. This rubber cushion in the form of a tube is applied over the duck fabric in a uniform thickness throughout the length of the hose. A number of plies of strong closely woven frictioned duck 5 is next applied in a form corresponding with the corrugated effect produced by the wire helix and superposed layer of duck and rubber. Upon this plurality of plies of duck is then placed a second rubber cushion 6 which may also be impregnated with a gasolene and oil-resisting compound.

Over the second cushion of rubber and positioned intermediate the elements of the first wire helix is a second wire helix 7 of substantially oval cross-section and almost or approximately equal in width to the spaces between the helix elements 1. Suitable dimensions for the wire would be ⅝" width and ¼" thickness. I prefer to make this second helix of solid wire as distinguished from the laminated wire construction used in the prior art. To provide a cushion for the final ply or plurality of plies of duck or outer covering, I place over the rubber cushion and second helix or wire, a ply of duck 8. This ply is also preferably composed of specially constructed strong bias-cut fabric which covers the oval wire 7 and a part of the rubber cushion 6 forming a corrugated fabric covering which allows the structure to flex naturally as well as prevent oils, water, etc. from penetrating into the under-structure. A one inch strip of fabric 9 is now helically applied to bridge the spaces between the oval wires 7. This fabric adds strength and prevents the fabric 8 from becoming loose or worn away from the corrugated rubber cushion 6. It also acts as an additional safeguard against oils, gasolenes, etc. from penetrating into the structure of the hose and permits independent freedom of movement without strain when the hose is fixed in any direction.

The entire structure is then preferably coated with a rubber covering 10 of the best oil and gasoline-resisting compound which protects the under-structure from atmospheric oxidation and also protects the wire 7 when the hose is dragged over sharp ends as on docks or decks of ships, thereby preventing sparks which might otherwise cause disastrous results.

In certain cases, as indicated in Fig. 3, the fabric ply 8 can be replaced by or used in association with a ply of open mesh fabric 8' such as cider cloth, and the strip 9, instead of being a 1" strip laid between the wires 7, may be made of fabric which continuously spans a plurality of the wires as well as the places between them.

In all cases the corrugated rubber tube 4 is made of the best oil- and gasolene-resisting compound, uniform in thickness throughout its entire length. Its corrugated formation allows the rubber tube to flex naturally without undue strain. The rubber tube 4 also forms a cushion for the fabric structures 2 and 3, the segment section wire 1 and the succeeding fabric structure 5.

The plies 5 are preferably constructed of strong bias-cut fabric applied in a corrugated manner and these plies form the main fabric support of the structure of the hose and allows the fabric to stretch naturally without strain. This corrugated structure of fabric which is cushioned by the corrugated rubber tube 4 and the corrugated rubber cushion 6, produces unusual strength to withstand heavy pressures and sharp bends.

The corrugated rubber tube 6 is composed of the same gasolene- and oil-resisting compound as the corrugated rubber tube 4 and it acts as a cushion for the corrugated plies of fabric 5 and the oval wire 7, allowing the structure of the hose to flex freely with a minimum amount of tension.

The oval wire 7 adds great strength to the hose and is a powerful protection for the main structure of the hose. It guards against chafing, produces great resisting strength against crushing, and at the same time permits the hose components 6, 5, 4, 3, 2, and 1 to flex naturally without creating undue strains in the entire structure.

In the most practicable type of oil hose now on the market the spiralled liner forming the internal bracing element of the hose is made of a flat galvanized wire. It is obvious that this type of construction presents a series of sharp angular bends thoughout the length of the hose, which sharp angular bends are ridden over by the frictioned duck adjacent such wire liner. When the oil hose thus constructed is bent, these sharp corners tend to rupture or cut their covering of duck and distort the rubber cushion. Furthermore, when the hose is flexed in a longitudinal direction, the use of a flat wire as an interior lining permits the duck to be forced from the corners of such wire, producing a space between the duck and the wire into which gasoline, oil, or any other liquid carried by the hose may seep. When the hose is then allowed to flex back into its original position, any liquid caught between the wire and the covering of duck will tend to force itself through the duck and rubber into the remaining portion of the body of the hose.

In my improved construction of hose, the provision of a spiralled wire liner permits the layer of duck covering to rest smoothly against the corners or edges of the lining wire, thus eliminating the chafing or rupturing of the fabric. Since the duck lies smoothly against the corners of such segment-sectioned wire, even when the hose is flexed to a considerable extent along its longitudinal axis, no space will be left between the wire and the duck into which liquid may seep. My construction therefore will prevent the wire from slipping out of its place with a bending of the hose. The two plies of very closely woven, strongly frictioned duck 2 will likewise be subjected to stretching to a smaller extent as the type of wire used in my novel construction of hose greatly reduces the slack in the fabric.

The rubber cushion 4, which may range from a thickness of $\frac{1}{64}$ of an inch to any thickness depending upon the conditions under which the hose is used, provides a uniform thickness of rubber throughout the entire length of the hose. Such uniform thickness is not obtainable in a construction in which a flat wire is used as a liner. The use of such a layer of rubber of uniform thickness throughout the length of the hose will eliminate the possibility of the liquid carried by the hose penetrating through such layer to the plurality of plies 5 of frictioned duck placed thereover.

The second layer of rubber 6 acts as a cushion for the second helix of modified oval wire 7. The function of this spiralled oval wire is an important one in my construction as it acts as a "rocker" and produces the great flexibility characteristic of my improved oil hose. By virtue of its cross-sectional shape, this helix prevents damage to the rubber cushion and to the fabric surrounding the spiralled wire liner even when the hose is being subjected to extreme conditions of service such as extreme pressures. As is shown in the drawings this modified oval wire is located opposite and bridges the spaces of the helix of wire lining the hose and acts to restain such lining wire from changing its original position no matter what the condition of flexing of the oil hose. This helix of modified oval wire being made solid, provides a greater protection against chafing than does the laminated construction now used.

Under extreme conditions of use including use of the oil hose under greater pressure than that for which it was designed, the hose is subjected to an elongation under which conditions the prior art structure has been found to be deficient as the flat wire lining is easily pushed from its original or intended position by the ply of heavy frictioned duck placed over such wire, which duck is necessarily under the stress of elongation. In my improved construction any elongation in the hose has the effect of bringing about a uniform strain throughout the plurality of layers of fabric, rubber and wire comprising the hose, and will therefore not restrict the stress due to such elongation to any particular point or series of points along the length of the hose.

Under the second extreme condition of use of the hose which consists in its being bent or flexed to any great extent, by the use of the substantially semicircular wire lining in combination with the second helix of modified oval wire and intermediate layers of fabric and rubber, the sharp angles and angular bends formed by a flat wire and fabric are avoided. Any possible damage to the fabric by liquid seeping through thereto and being caught in the interstices between wire and fabric is thus reduced to a minimum.

It will thus be seen that my improved construction of oil, suction, and discharge hose, is built in such a way as to resist the greatest pressures to give the greatest factor of safety, to endure rough handling, to resist great crushing strength, to withstand exterior chafing, to give the longest service and to supply the smoothest interior surface for the liquids to flow through with the minimum amount of friction. The new hose will stand greater flexing and elongation, will eliminate undue stretching of the rubber cushions provided for the spiral wires forming the body of the hose and will withstand all of the stresses brought about by extraordinary internal pressures or suctions, the entire hose being capable of flexing in any direction in a natural manner without strain.

This application is a continuation in part of my patent application, Serial No. 418,013, filed January 2, 1930, allowed March 10, 1931, and abandoned upon the filing of the present application.

I claim:

1. In a construction of oil hose, the combination with a helical liner of segment-sectional wire, the convolutions of which are spaced from one another, of successive layers of a closely woven duck, rubber, a plurality of plies of duck, a second layer of rubber, a helix of wire, of substantially oval cross-section, approximating in width the width of the spaces between the convolutions of the segment-sectioned wire, and a covering layer of heavy duck frictioned with an oil-resisting compound.

2. In a construction of oil hose, the combination with a helix of segment-sectioned wire, the convolutions of which are spaced from one another, of a layer of closely woven duck frictioned with an oil-resisting compound, a rubber cushion, a second layer of a plurality of plies of closely woven frictioned duck, a second layer of rubber, a helix of wire of substantially oval cross-section located opposite the spaces between the convolutions of the segment-sectioned wire and approximating in width the width of said spaces and an outer covering comprising a heavily frictioned fabric.

3. In a construction of oil hose, the combination with a helical liner constituted of a wire of segmental cross-section, the convolutions of which are spaced from one another, of a plurality of plies of a frictioned fabric, a rubber cushion superposed thereon, a second layer of frictioned fabric, a second rubber cushion presenting with the helical liner wire a corrugated cross-section, a helix of wire of substantially oval cross-section located intermediate the convolutions of the helical liner and approximating in width the width of the spaces between the convolutions of the helical liner, and an outer covering of heavily frictioned fabric.

4. In a construction of oil hose, the combination with a helical liner of wire whose cross-section is substantially a segment of a circle with a chord shorter than its diameter, the convolutions of said wire being spaced from one another, of a helix of wire of substantially oval cross-section and approximating in width the width of the spaces between the convolutions of the helical segment-sectioned wire liner disposed intermediate the convolutions of said liner, and a fabric hose material between the convolutions of the liner wire and between the outer faces of said helical liner and inner faces of the oval wire.

5. In a construction of oil hose, the combination with a helical liner of wire whose convolutions are spaced from one another and whose cross-section is substantially a segment of a circle with a chord shorter than its diameter, of a helix of wire of substantially oval cross-section disposed intermediate the convolutions of said liner and separated therefrom by a plurality of layers of fabric and rubber, said oval wire approximating in width the width of the spaces between the convolutions of the helical segment-sectioned wire liner.

6. In a construction of oil hose, the combination with a helical liner of wire, whose convolutions are spaced from one another and whose cross-section is substantially a segment of a circle with a chord shorter than its diameter, of a layer of frictioned fabric, a uniform layer of rubber, a helix of wire of substantially oval cross-section, the convolutions thereof being approximately equal in width to the width of the spaces between the convolutions of the segment-sectioned wire liner and disposed opposite the spaces intermediate the convolutions of said liner, and an outer covering for said hose.

7. In a construction of oil hose, the combination with a helical liner of segment-sectioned wire, the convolutions of which are spaced from one another, of a duck material covering and closely following the curved portions of the liner and occupying the spaces between the convolutions of the liner, the inner faces of the duck between said convolutions being in the same plane as the flat faces of the convolutions of the segmental wire, a fabric helix approximating in width and seated in the convolution spaces of the wire, successive layers of rubber and fabric hose material, a helix of wire of substantially oval cross-section approximating in width the width of the spaces between the convolutions of the segment-sectioned wire, and an outer covering.

8. In a construction of oil hose, the combination with a helical liner of segment-sectioned wire, the convolutions of which are spaced from one another, of a duck material covering and closely following the curved portions of the liner and occupying the spaces between the convolutions of the liner, the inner faces of the duck between said convolutions being in the same plane as the flat faces of the convolutions of the segmental wire, a fabric helix wider than, and situated in, the convolution spaces of the wire and having lateral edges following in part the curvature of the liner wire, successive layers of rubber and fabric hose material, a helix of wire of substantially oval cross-section approximating in width the width of the spaces between the convolutions of the segment-sectioned wire, and an outer covering.

9. In a construction of oil hose, the combination with a helical liner of segment-sectioned wire, the convolutions of which are spaced from one another, of a duck material covering and closely following the curved portions of the liner and occupying the spaces between the convolutions of the liner, the inner faces of the duck between said convolutions being in the same plane as the flat faces of the convolutions of the segmental wire, a fabric helix approximating in width, and seated in, the convolution spaces of the wire, successive layers of rubber and fabric hose material, a helix of wire of substantially oval cross-section the convolutions of which are spaced from one another, the wire approximating in width the width of the spaces between the convolutions of the segment-sectioned wire, and an outer covering, said outer covering including a helical strip of fabric approximating in width, and seated in, the convolution spaces of the oval wire.

10. In a construction of oil hose, the combination with a helical liner of segment-sectioned wire, the convolutions of which are spaced from one another, of a duck material covering and closely following the curved portions of the liner and occupying the spaces between the convolutions of the liner, the inner faces of the duck between said convolutions being in the same plane as the flat faces of the convolutions of the segmental wire, a fabric helix wider than, and situated in, the convolution spaces of the wire and having lateral edges following in part the curvature of the liner wire, successive layers of rubber and fabric hose material, a helix of wire of substantially oval cross-section the convolutions of which are spaced from one another, the wire approximating in width the width of the spaces between the convolutions of the segment-sectioned wire, and an outer covering, said outer covering including a helical strip of fabric wider than, and seated in, the convolution spaces of the oval wire and having lateral edges following in part the outer curvature of the oval wire.

In testimony whereof I have hereunto set my hand.

ERNEST SCHULTHESS.